United States Patent [19]
DeClerck

[11] Patent Number: 5,515,375
[45] Date of Patent: May 7, 1996

[54] METHOD AND APPARATUS FOR MULTIPLEXING FIXED LENGTH MESSAGE DATA AND VARIABLY CODED SPEECH

[75] Inventor: Daniel J. DeClerck, Algonquin, Ill.

[73] Assignee: Motorola, Inc., Schaumburg, Ill.

[21] Appl. No.: 99,881

[22] Filed: Jul. 30, 1993

[51] Int. Cl.[6] .................................................. H04J 3/16
[52] U.S. Cl. ............................ 370/84; 370/79; 370/95.1; 370/110.1
[58] Field of Search .................................. 370/43, 45, 81, 370/82, 79, 80, 99, 60, 84, 95.1, 95.3, 110.1, 110.4, 111, 112, 94.1, 94.2

[56] References Cited

U.S. PATENT DOCUMENTS

| | | | |
|---|---|---|---|
| 4,145,657 | 3/1979 | Hanni | 325/32 |
| 4,377,860 | 3/1983 | Godbole | 370/84 |
| 4,914,650 | 4/1990 | Siriram | 370/60 |
| 5,072,444 | 10/1991 | Breeden et al. | 370/84 |
| 5,115,429 | 5/1992 | Hluchyj et al. | 370/84 |
| 5,146,610 | 9/1992 | Longshore et al. | 455/35.1 |
| 5,159,608 | 10/1992 | Falconer et al. | 375/1 |

OTHER PUBLICATIONS

*TR45 Mobile Station—Base Station Campatability Standard For Dual—Model Wideband Spread Spectrum Cellular System*, Working Document PN–3118 to be published as IS–95, Telecommunications Industry Association, pp. i–xiii and sections 6.1.3.3–6.1.3.3.11.4, 6.6.4.1.3–6.6.4.1.3.3, 7.1.3.5–7.1.3.5.11.4 and 7.6.1.3–7.6.4.1.3.3 with numerically corresponding figures and tables, Feb. 11, 1993.

*Primary Examiner*—Melvin Marcelo
*Assistant Examiner*—Huy D. Vu
*Attorney, Agent, or Firm*—Daniel W. Juffernbruch

[57] ABSTRACT

Speech of an unknown amount and control message data (150) of known amount are multiplexed so that the coded voice data is transmitted before the elapse of a predetermined number of frames. A variable rate vocoder (110) receives and codes the speech of an unknown amount at one of full and less than full rates to produce the coded voice data. A multiplexer (120) receives the coded voice data from the variable rate vocoder (110) and sends frames containing the coded voice data when the variable rate vocoder operates at a full rate. When the variable rate vocoder (110) operates at a less than full rate, the multiplexer (120) sends frames containing portions of the message data together with the coded voice data. However, when the number of frames remaining before a predetermined number of flames has been sent is the minimum number of frames necessary to send remaining of the control message data (150) together with the coded voice data at less than full rate, the variable rate vocoder (110) is forced to a voice coding rate lower than full rate. The lower than full rate voice coding of the variable rate vocoder (110) reduces the amount of coded voice data to send in a frame and makes space in the frame to send remaining of the control message data (150) together with the coded voice data.

38 Claims, 4 Drawing Sheets

METHOD AND APPARATUS FOR MULTIPLEXING FIXED LENGTH MESSAGE DATA AND VARIABLY CODED SPEECH

BACKGROUND OF THE INVENTION

1. Technical Field of the Invention

The present invention relates to a method and apparatus for multiplexing coded voice data and fixed length message data requiring transmission within a maximum response time and, more particularly, a method and apparatus for controlling a rate of coding the coded voice data to transmit the fixed length message data within the maximum response time.

2. Description of the Related Art

Speech in known cellular telephones is detected by a microphone and coded by a vocoder. The vocoder provides coded voice data representative of the speech. Cellular telephones need to transmit control messages besides coded voice data. Known cellular telephone formats transmit the control messages in separate packets from the coded voice data. These separate packets of control messages and coded voice data are multiplexed to transmit them on a channel.

When a cellular telephone sends a control message to a base station, the base station typically must acknowledge receipt of the control message. In the round trip transmission of the control message from the cellular telephone or the acknowledgment from the base station, the transmitted radio waves may not reach their destinations. Atmospheric conditions, random reflections of the radio wave off buildings or hills, etc. can obstruct reception of the radio waves. When a radio wave is obstructed, a the cellular telephone should not have to wait indefinitely for the acknowledgment form the base station.

Control messages containing an acknowledgment have thus been required to be transmitted within a maximum response time. A cellular telephone waiting for an acknowledgment then knows that after the maximum response time, the acknowledgment must have either been sent and obstructed or the original control message never received due to atmospheric obstructions.

In a cellular telephone transmission system, several incompatible goals are pursued. The speech should be transmitted in real time without a reduction in quality. The speech must also be transmitted together with control messages using the smallest amount of data possible. Also, the transmission must conserve the limited radio spectrum and minimize interference with other users. Finally, as discussed above, a control message containing an acknowledgment must be promptly transmitted within a maximum response time. This invention provides for the transmission of message data within a maximum response time together with coded voice data and, in particular, sends the message data without a noticeable reduction in voice quality while conserving spectrum and reducing interference to other users.

SUMMARY OF INVENTION

The present invention solves these and other problems by providing the following and other features of the invention. When speech requires a high voice coding rate, a variable rate vocoder codes the speech at a high rate to produce coded voice data for transmission by a multiplexer. However, when the speech does not require as high of a voice coding rate, the vocoder codes the speech at a lower rate to produce less coded voice data to be transmitted. The multiplexer then combines the coded voice data with portions of the control message data for transmission. The entire control message data is, however, promptly sent before a maximum response time elapses by forcing the coding of the speech to a lower rate to make room in the coded voice data for multiplexing remaining portions of the control message data. Thus, the multiplexer transmits the control message data within a maximum response time and transmits the coded voice data with a lower than optimum voice coding rate only when necessary at the end of the maximum response time. When new control message data is generated before an earlier generated control message data has been sent, additional measures are taken to insure that the new message data is also sent before elapse of its respective maximum response time.

These and other constructions and features of the present invention will become more apparent from the following detailed description when read in conjunction with the accompanying drawings.

DETAILED DESCRIPTION OF THE DRAWINGS

DETAILED DESCRIPTION OF THE PREFERRED EMBODIMENTS

Figure 1:
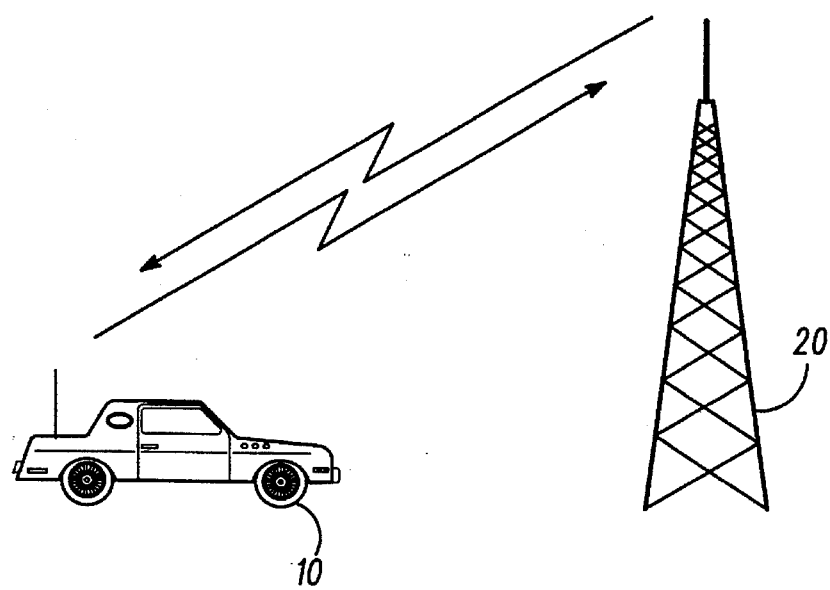
FIG. 1 illustrates a radio telephone communication system according to the present invention.

FIG. 1 illustrates a radio telephone communication system. A mobile station 10, or portable handheld unit, communicates with a base station 20. The mobile station 10 and the base station 20 can contain vocoders for converting speech to coded voice data in a representation suitable for digital transmission. Variable rate vocoders can be used to code the speech at a variable rate based upon the characteristics of the speech to be coded. A variable rate vocoder typically operates at a full rate or rates divided by a multiple of two, such as one-half rate, one-quarter rate, one-eighth rate, one-sixteenth rate, etc. When a speaker pauses or stops speaking in a quiet room, for example, the speech has characteristics that do not require as high of a voice coding rate. Then, the variable rate vocoder will autonomously lower the coding rate needed for optimum voice coding. If the speaker stops speaking a very quiet room, the vocoder rate will autonomously drop to a voice coding rate of one-quarter or one-eighth. However, if the speaker stops speaking at a noisy restaurant or construction site, for example, the vocoder will not drop below the full rate of voice coding because the background noise will be detected and encoded as speech.

Because a cellular telephone should not be designed to wait indefinitely for receipt of an acknowledgment, a cellular telephone is designed to wait no longer than a maximum response time. Control message data containing an acknowledgment is thus required in some format specifications to be sent before a maximum response time elapses. For example, in the cellular CDMA format specification of the Telecommunications Industry Association, PN-3118, ballot version, a mobile station 10 must send an acknowledgment within 200 ms and a base station 20 must send an acknowledgment within 400 ms. Assuming each frame is 20 ms in duration, then, a base station 20 must send an acknowledgment before the elapse of 20 frames.

To send the acknowledgment before the maximum response time, typically, the vocoder would be forced to a vocoding rate such as a one-half rate to make room for immediate transmission of the control message. Forcing the vocoder to operate at a lower than full rate will degrade coded voice data quality for speech having characteristics requiring a full rate. If an entire cellular radio telephone conversation occurs at a noisy restaurant or construction site, for example, the vocoder will not autonomously drop below the full voice coding rate. When a vocoder wants to operate at a full rate for optimum transmission, the vocoder should not be forced too far below the full rate or a noticeably degraded transmission will result. Thus, forcing a vocoder to a lower rate should be avoided to prevent noticeable degradation of the voice quality.

The present invention seeks to avoid forcing the vocoder to a lower rate and degrading coded voice data quality by waiting to reduce the vocoding rate. The present invention waits to reduce the vocoding rate during the maximum response time and takes advantage of autonomous drops in the vocoding rate of the vocoder to send control messages. Near the end of the maximum response time, in the event enough space for the control messages has not been created by autonomous drops in the vocoding rate, the vocoder is forced to a lower rate, and remaining of the control data is then transmitted before the end of the maximum response time. The control message is thus transmitted before elapse of the maximum response time while optimum speech encoding is achieved.

Further, by sending the control messages in the space created by a lower vocoding rate, spectrum can be conserved and interference to other cellular phone users can be reduced in a spread spectrum format. This is because users share the same band of frequencies in a spread spectrum format.

Figure 2:
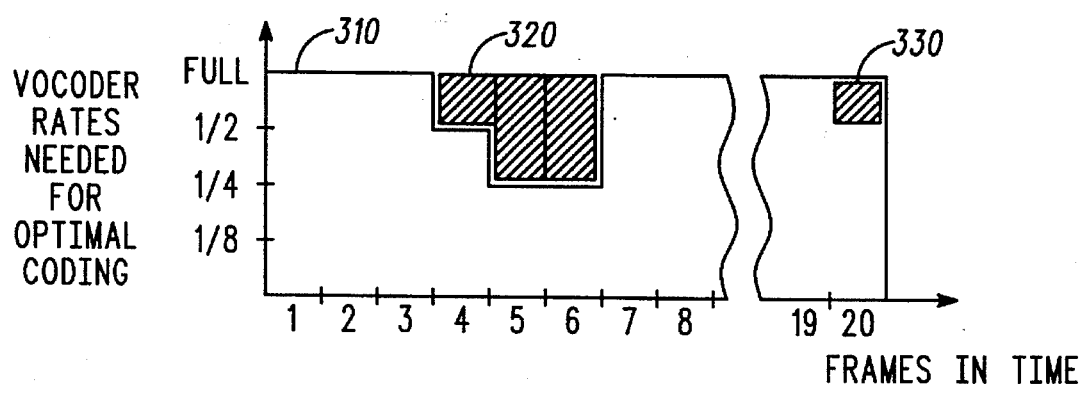
FIG. 2 illustrates a timing diagram of control message data and coded voice data illustrating the different voice coding rates possible according to the present invention.

FIG. 2 illustrates a timing diagram of transmitted frames. Vocoder rates needed for optimum speech are illustrated by curve 310 for each of the frames. As illustrated in this example, during frames 1, 2 and 3, the speech has characteristics requiring a full voice coding rate for optimal voice coding. However, in frame 4, for example, the speech has characteristics that only needs one-half rate voice coding. Thus a portion of the control message data bits 320 can be inserted in frame 4 with the coded voice data. Additionally, in frames 5 and 6, the characteristics of the speech only requires one-quarter rate voice coding and portions of the control message data bits 320 can be inserted in frames 5 and 6. In frames 7 through 20 of FIG. 2, the characteristics of the speech again requires full rate voice coding. For example, the speech could have occurred at a construction site and the speaker quit speaking after the frame 3. At frame 7, however, construction equipment such as a loud jackhammer may have began operation to produce background noise which is detected by the vocoder as speech requiring a full voice coding rate. By frame 20, the vocoder rate has not dropped enough to transmit all of the bits of the message data. Thus, remaining data 330 of the message data is transmitted in the frame 20, and the voice coding rate of the vocoder is forced during the frame 20 to a lower rate.

Figure 3:
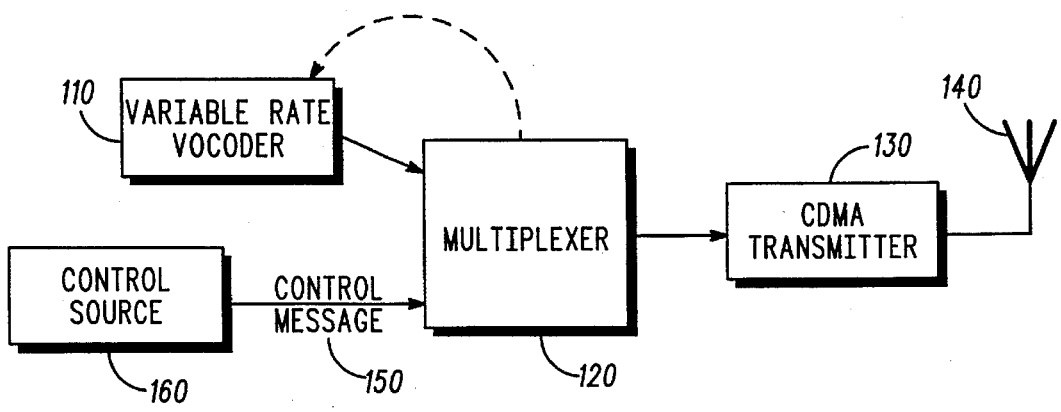
FIG. 3 illustrates a block diagram of a radio apparatus for voice coding and multiplexing according to the present invention.

FIG. 3 illustrates a block diagram of a radio transmitter apparatus for multiplexing a control message and coded voice data. A vocoder 110 codes data at a variable rate based upon the characteristics of the speech to be coded. A multiplexer 120 receives the coded voice data from the variable rate vocoder 110 and sends the coded voice data to a transmitter 130 for transmission by an antenna 140 over the air. The multiplexer 120 multiplexes a control message 150 from a control source 160 together with the coded voice data for transmission. The transmitter 130 can be a code division multiple access (CDMA) transmitter When the multiplexer 120 cannot insert enough of the control message data 150 in the coded voice data, the multiplexer 120 forces the variable rate vocoder 110 to a lower voice coding rate. At a lower voice coding rate, a frame has room for transmission of both the lower rate coded voice data and bits of the control message.

Figure 4:
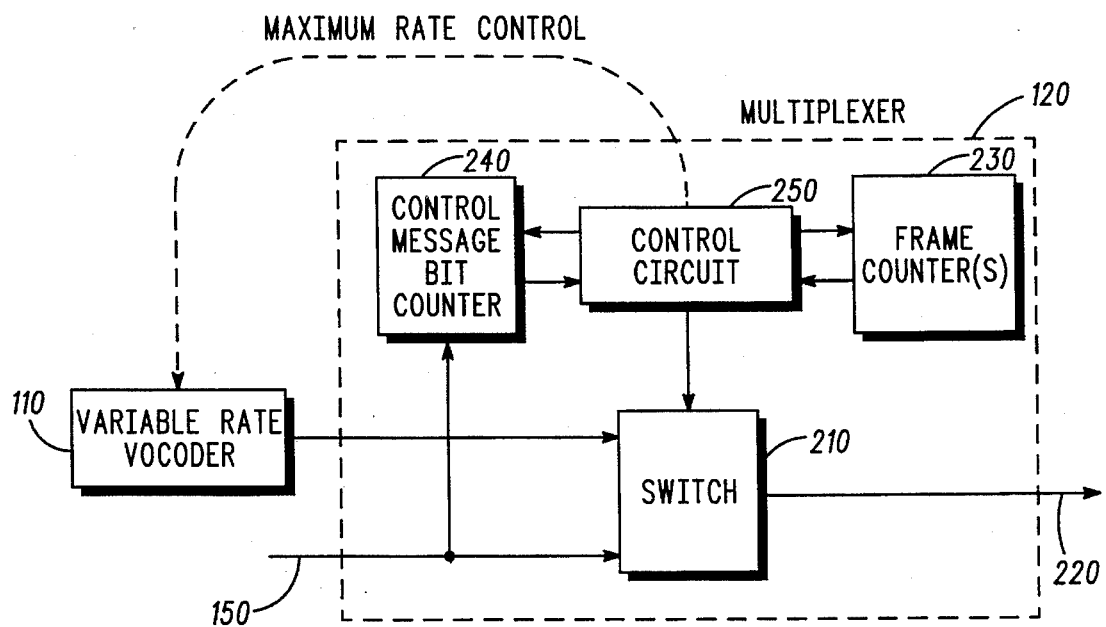
FIG. 4 illustrates a block diagram of an apparatus for voice coding and multiplexing according to the present invention.

FIG. 4 illustrates a block diagram providing details of the multiplexer 120 according to the present invention. A switch 210 sends either the coded voice data from the variable rate vocoder 110 or the control message 150 to an output line 220 of the multiplexer 120. A Frame counter 230 counts the frames sent out by switch 210 on the output line 220. A data counter 240 counts bits of the control message sent by the switch 210. The switch 210 and a maximum rate of the variable rate vocoder 110 is controlled by a control circuit 250 based upon counts in the frame counter 230 and the data counter 240 to ensure transmission of the entire control message 150 before elapse of a predetermined number of flames. Because the multiplexer 120 is assumed to produce each frame as a unit of time that is repeated, the control is thus also transmitted before the predetermined number of frames or maximum response time elapses. If the frames do not represent a unit of time that is repeated, the frame counter 230 could be replaced by a time counter, for example.

When the frame counter 230 and the data counter 240 indicate that the switch 210 cannot send the remaining bits of the control message 150 before the predetermined number of frames elapses, the control circuit 250 forces the variable rate vocoder 110 to a maximum rate less than a full voice coding rate. When a vocoder is used to code voice or speech, the variable rate vocoder 110 typically operates at a full rate or rates divided by a multiple of 2, such as one-half rate, one-quarter rate, one-eighth rate, one-sixteenth rate, etc. In the present invention, a variable rate vocoder 110 autonomously drops to a less than full rate when the characteristics of speech require a lower rate. Because a one-half rate for a vocoder typically is the next rate lower than full, forcing from full rate to one-half rate is preferred. However, vocoding will still occur, although at reduced performance, if forced to rates lower than one-half, such as one-quarter, one-eighth, etc.

According to the present invention, both the mobile and the base of a radio telephone communication system do not need to embody the voice coding rate control. However, both multiplexers can embody the voice coding rate control. Although the preferred embodiment of the invention discloses by example a code division multiple access (CDMA) type, spread spectrum format, the present invention is applicable to other types of digital radiotelephone formats including time division multiple access (TDMA).

Figure 5:
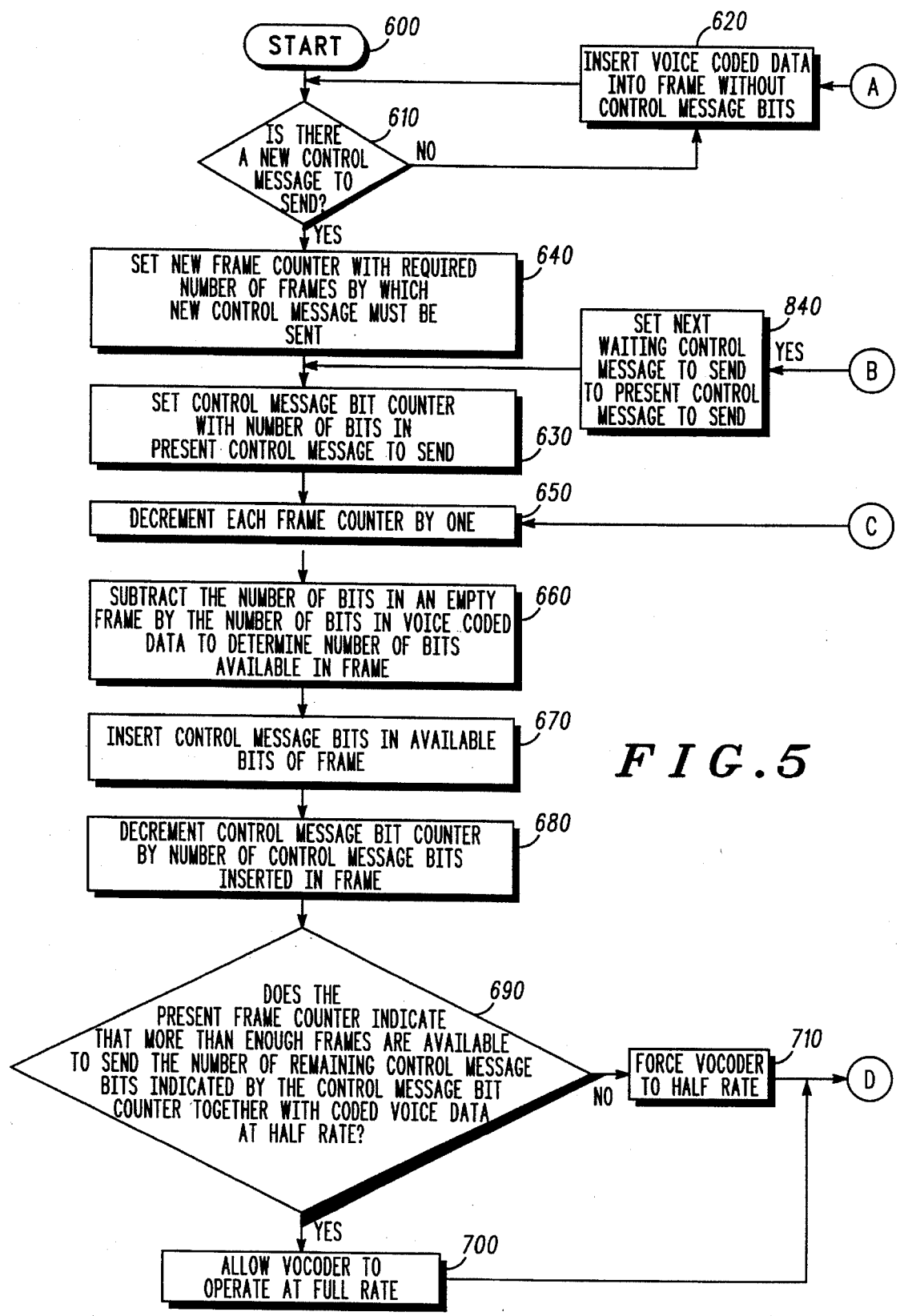
FIGS. 5 and 6 illustrate a flow chart of an operation according to the present invention.
Figure 6:
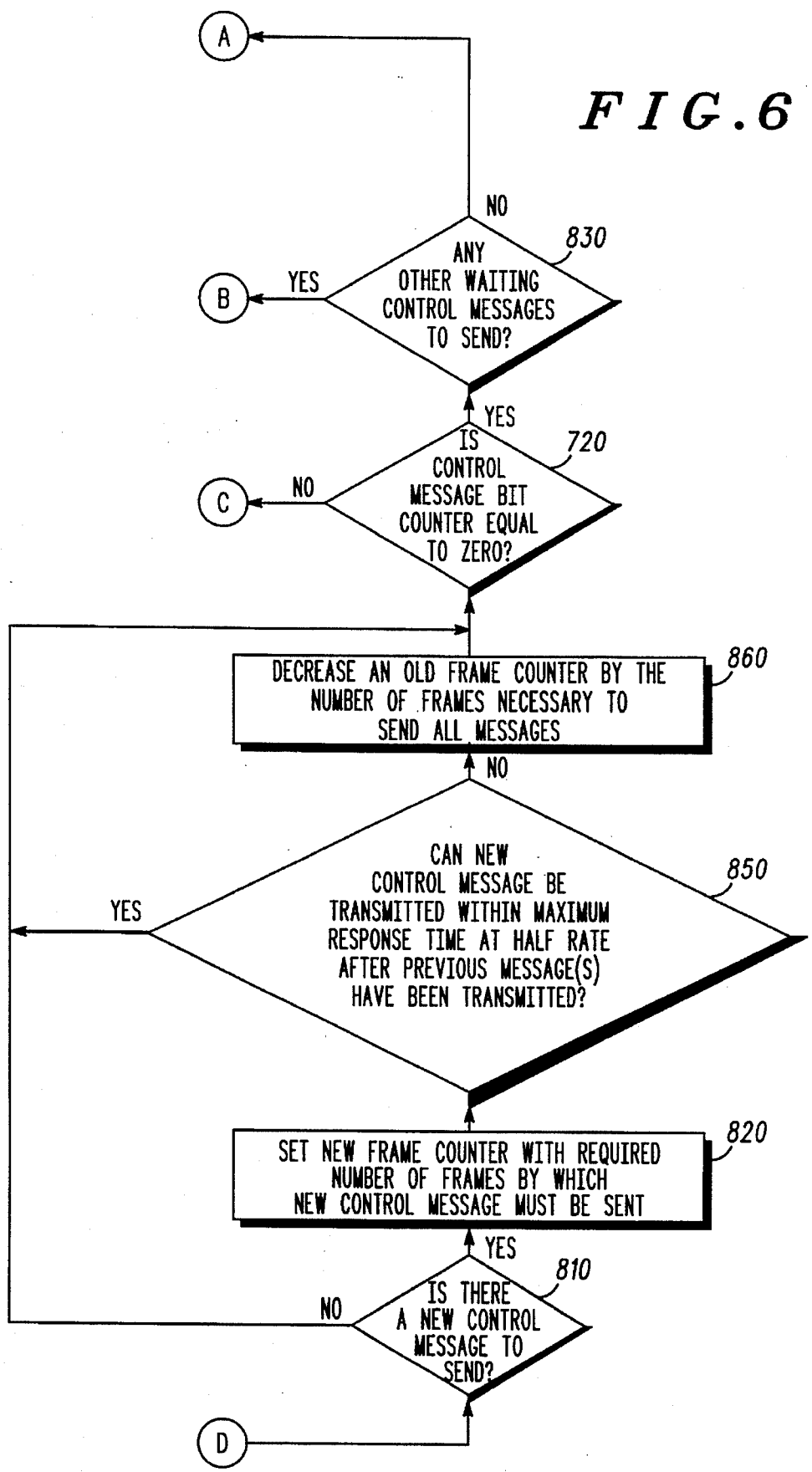

FIGS. 5 and 6 illustrate a flow chart providing an explanation of the method performed according to the present invention. In summary, with reference to FIGS. 5 and 6, the present invention takes advantage of available space in the frames in step 670. Step 690 checks to determine if the future flames, at half rate, have more than enough space available to send remaining of the control message data before the end of the maximum response time. If the future frames do not have enough space available to send the remaining of the control message data, then the vocoder is forced to at least half-rate in step 710 to insure the transmission of the control data before the end of the maximum response time.

As an example of the determination performed in step 690, assume that a cellular radio telephone format requires that a control message must be completely sent out within 400 ms in frames having a unit length of 20 ms each. Assuming that a 140 byte control message is received to send from a base station to a mobile station, and this message requires acknowledgment, a message must be completely sent in 400 ms. The 140 byte control message is thus composed of 1120 bits which would be stored in the control message bit counter, because 140 bytes×8 bits per byte= 1120 bits. Additionally, the number of frames required by which the control message must be sent will equal 20 frames because 400 ms divided by 20 ms per frame equals 20 frames. Thus, the frame counter will initially be set to 20 frames. Step 690, in this example, would then determine the number of frames at one-half rate or lower are necessary to send the control message. Assuming each frame has a total of 172 bits available for data transmission, at one-half rate, 86 bits would be available for control message transmission in each frame. Thus, the 1120 bit message would require 14 frames of one-half rate or less speech for transmission, because 1120/86=14. Because 20 frames are available to send the message during the maximum response time, step 690 can keep the vocoder at full rate for at least the first 6 frames. At the seventh frame, if the vocoder had not autonomously dropped to less than full rate, step 690 would need to force the vocoder to a less than full rate to send a control message data. However, if during any of the first six frames the vocoder had autonomously dropped to half rate, then 86 of the 1120 control message bits would have been transmitted and step 690 would not need to force the vocoder to less than full rate for the seventh frame. Step 690 thus ensures that enough frames are available to send the remaining control message data before the end of the maximum response time or number of frames.

For the transmission of a single control message, in greater detail, the method of FIGS. 5 and 6 operates as follows. After an initial start step 600, a determination is made in step 610 whether a new control message has been received from a control source. If no control message has been received to send, step 610 proceeds to step 620 where the coded voice data is sent by switch to transmit a frame without insertion of any control message bits. Step 620 then proceeds back to the beginning of step 610.

If step 610 determines that there is a new control message to send, the frame counter 230 is set in step 640. Step 640 sets the frame counter 230 with the maximum response time represented by a required number of frames by which the control message must be sent. Thus, assuming each frame is the same unit length, counting frames sent by the multiplexer will determine the period of time before the control message data must be sent. Then, the number of bits in the control message is determined and this number of bits is set by step 630 in the data counter 240.

After step 630, step 650 prepares for transmission of a frame by the multiplexer by decrementing the frame counter by one. Then, in step 660, the number of bits in the coded voice data received from the vocoder is determined. This number of bits in the coded voice data is subtracted from the number of bits in an empty frame to then determine the number of bits available in a frame. Then, after step 660, step 670 inserts control message bits in the available bits of the frame assuming step 600 determines bits were available in the frame. Thereafter, step 680 decrements the data counter 240 by the number of control message bits inserted by step 670 in the frame to be transmitted. Then, at the end of step 680, a frame is transmitted from the multiplexer.

After step 680, step 690 determines the necessary vocoder rate for the next frame to be transmitted. Step 690 determines if enough frames are available to send the remaining amount of the control message bits before the end of the maximum response time. Step 690 determines if the frame counter indicates that more than enough frames are available to send the number of remaining control message bits indicated by the control message bit counter together with the coded voice data at one-half rate. If more than enough frames are available, step 690 proceeds to step 700 and allows the vocoder to operate at full rate. However, should the vocoder choose to drop to a less than full rate, the control of step 690 should not force the vocoder to a higher rate.

Should step 690 determine that not enough frames are available to send the number of remaining control message bits at one-half rate, step 690 proceeds to step 710 where the vocoder is forced to one-half rate to guarantee space for insertion of the control message bits in the next frame. However, should the vocoder choose to drop to an even lower rate such as one-quarter rate, the control of step 690 should not force the vocoder to a higher rate.

After step 710, step 720 determines if any control message bits remain by checking if the control message bit counter has dropped to zero. If control message bits remain, flow proceeds to step 650 to continue transmission of the control message with the coded voice data. However, if step 720 determines that the control message has completely been sent and no control message bits remain, flow proceeds to the beginning at step 610 where a new control message can be obtained to be sent.

When a new control message is generated before an earlier generated control message has been sent, steps 810, 820, 830, 840, 850 and 860 are used in a more developed embodiment of the invention. These steps insure that a new message is also sent before elapse of its respective predetermined number of frames. For example, assume a second control message is received one frame after a first control message. The predetermined number of frames of the second control message thus will expire one frame after the predetermined number of frames of the first control message. Without steps 810, 820, 830, 840, 850 and 860, the second control message might only be allocated one frame to send the entire second control message after sending the first control message.

Step 810 checks during transmission of a message if a new message is received to send. If a new message is received to send, step 820 sets a new frame counter with the required number of flames by which the new control message must be sent. Thereafter step 850 determines if the new control message can be sent within the maximum response time at half rate after the previous message or massages have been sent. For the case where the new control message is received one frame after a first control message, step 850 would determine, for example, if the second new control message can be sent at half rate in only one frame. If the second new control message can not be sent within the maximum response time, then step 850 proceeds to step 860. Step 860 decreases an old frame counter of an earlier received message by the number of frames necessary to send all of the messages to be sent.

Step 720 is executed after step 820 when no new control messages are received to be sent, after step 850 when plenty of time is available to send a new control message and after step 860. As discussed above in the discussion of the simpler embodiment without multiple messages, step 720 determines if the control message bit counter corresponding to a control message presently being transmitted indicates that the present message has been completely sent. If the control message presently being transmitted has been completely sent, step 830 checks if any other control messages are waiting to be sent. If no control message is waiting to be sent, then step 830 proceeds to step 620 where a loop occurs to wait for a reception of a new control message to be sent. If a control message is waiting to be sent, step 840 establishes that the waiting control message shall become the present control message to be sent. Step 630 then sets the control message bit counter with the number of bits in the control message to be sent, and the message is thereafter sent as discussed above in the discussion of the simpler embodiment without multiple messages.

The counters and switch of the multiplexer of the present invention can be constructed by an application specific integrated circuit or by discrete components. Further, and preferably, the multiplexer can be part of a digital signal processor or even implemented in a fast running microprocessor. If a digital signal processor is used, the digital signal processor can be implemented according to the flow chart of FIGS. 5 and 6.

The present invention has an added advantage of reduced interference to other users when implemented with a spread spectrum type format transceiver. Spread spectrum transceivers transmit a single voice channel over a plurality of randomly varying frequencies unlike other systems that transmit the voice channel over a single frequency channel. In a spread spectrum format, some frequencies from other users will overlap or interfere with one another, but, however, all the frequencies will not be completely damaged by such interference and the transmission can be reliably received after pseudo random demodulation. In ordinary system, one frequency channel is allocated to a user during an entire transmission. In these ordinary systems, a vocoder operates continuously at a full voice coding rate because there is no reason to transmit less data over a channel that has completely been allocated to a user for a given communication or conversation. However, in a spread spectrum format, all users share the same band of frequencies. Therefore, an incentive exists to reduce the rate of vocoding by vocoder when no degradation in voice quality would occur. Spread spectrum formats provide an opportunity to insert control message data when the vocoder is operated at less than full rate and also reduce interference to other users.

Further, in the present invention, to prevent one radio telephone from waiting an indefinite period of time for reception of a control message which may have been lost due to transmission losses, etc., a transmitter is programmed to transmit the control message within a maximum response time and the receiver is programmed to expect reception of such control message data within this maximum response time. Thus a control message is transmitted before elapse of the maximum response time while optimum speech encoding is achieved.

Although the invention has been described and illustrated in the above description and drawings, it is understood that this description is by example only and that numerous changes and modifications can be made by those skilled in the art without departing from the true spirit and scope of the invention. For instance, although the preferred embodiment illustrates a radio telephone, the present invention may be implemented on satellite communications systems or even land based systems such as wireline or optical fiber link.

What is claimed is:

1. An apparatus for sending frames of like duration, the frames containing any of speech of an unknown amount and message data of a known amount, the message data requiring transmission before the elapse of a predetermined number of frames, comprising:

a variable rate vocoder to receive and code the speech of an unknown amount at one of full and less than full rates to produce coded voice data; and a multiplexer operatively connected to the variable rate vocoder to send frames containing the coded voice data when said variable rate vocoder operates at a full rate, to send frames containing portions of the message data together with the coded voice data when said variable rate vocoder operates at a less than full rate, and comprising a frame counter configured to count each frame transmitted since receipt of the message data of a known amount; and a control circuit operatively connected to said variable rate vocoder and said frame counter to force said variable rate vocoder to a less than full rate to send frames containing remaining of the message data together with the coded voice data based on a count of said frame counter, the amount remaining of the message data and the predetermined number of frames when the number of frames remaining before the predetermined number of frames has been sent is the minimum number of frames necessary to send remaining of the message data together with the coded voice data at less than full rate.

2. An apparatus according to claim 1, wherein said multiplexer further comprises a data counter operatively connected to count sent portions of the message data to determine amount remaining of the message data to be sent; and wherein said control circuit is operatively connected to said variable rate vocoder, said frame counter and said data counter to force said variable rate vocoder to a less than full rate based on a count of said frame counter, the amount remaining of the message data determined by said data counter, and the predetermined number of frames.

3. An apparatus according to claim 1, wherein said multiplexer comprises another frame counter configured to count each frame transmitted since another receipt of another message data; and wherein said control circuit is operatively connected to said frame counters to determine if the another message data can be sent within elapse of a number of frames corresponding thereto and to decrease the frame counter by the number of frames necessary to send the messages.

4. An apparatus according to claim 1, wherein said multiplexer forces said variable rate vocoder from full rate to one-eighth rate when the number of frames remaining before the predetermined number of frames has been sent is the minimum number of frames necessary to send remaining of the message data together with the coded voice data at less than full rate.

5. An apparatus according to claim 1, wherein said multiplexer forces said variable rate vocoder from full rate to one-half rate when the number of frames remaining before the predetermined number of frames has been sent is the minimum number of frames necessary to send remaining of the message data together with the coded voice data at less than full rate.

6. An apparatus according to claim 1, wherein said multiplexer forces said variable rate vocoder from full rate to one-quarter rate when the number of frames remaining before the predetermined number of frames has been sent is the minimum number of frames necessary to send remaining of the message data together with the coded voice data at less than full rate.

7. An apparatus according to claim 1,
wherein said variable rate vocoder operates at a rate sufficient to perform an optimal voice coding of the speech; and
wherein said control circuit is operatively connected to said variable rate vocoder to force the variable rate vocoder to a lower rate and perform less than optimal voice coding of the speech when the number of frames remaining before the predetermined number of frames has been sent is the minimum number of frames necessary to send remaining of the message data together with the coded voice data at less than full rate.

8. A radio having a communication transmitter capable of transmitting frames of a predetermined duration, the frames containing any of speech of an unknown amount and message data of a known amount, the message data requiring transmission before the elapse of a predetermined number of frames, comprising:
a variable rate vocoder to receive and code the speech of an unknown amount at one of full and less than full rates to produce coded voice data; and
a multiplexer operatively connected to the variable rate vocoder to receive the coded voice data, to send frames containing the coded voice data when said variable rate vocoder operates at a full rate, to send frames containing portions of the message data together with the coded voice data when said variable rate vocoder operates at a less than full rate, and comprising
a frame counter configured to count each frame transmitted since receipt of the message data of a known amount; and
a control circuit operatively connected to said variable rate vocoder and said frame counter to force said variable rate vocoder to a less than full rate to send frames containing remaining of the message data together with the coded voice data based on a count of said frame counter, the amount remaining of the message data and the predetermined number of frames when the number of frames remaining before the predetermined number of frames has been sent is the minimum number of frames necessary to send remaining of the message data together with the coded voice data at less than full rate; and
a radio transmitter operatively connected to said multiplexer to transmit the frames provided from said multiplexer.

9. A radio transmitter according to claim 8, wherein said radio transmitter comprises a spread spectrum transmitter.

10. A radio transmitter according to claim 9, wherein said spread spectrum transmitter comprises a code division multiple access transmitter.

11. A radio communication system capable of transmitting and receiving frames of a predetermined duration, the frames containing any of speech of an unknown amount and message data of a known amount, the message data requiring transmission before the elapse of a predetermined number of frames, comprising:
a first transceiver comprising
a first variable rate vocoder to receive and code first speech of an unknown amount at one of full and less than full rates to produce first coded voice data;
a first multiplexer operatively connected to the first variable rate vocoder to receive the first coded voice data, to send frames containing the first coded voice data when said first variable rate vocoder operates at a full rate, to send frames containing portions of first message data together with the first coded voice data when said variable rate vocoder operates at a less than full rate, and comprising
a frame counter configured to count each frame transmitted since receipt of the first message data of a known amount; and
a control circuit operatively connected to said first variable rate vocoder and said frame counter to force said first variable rate vocoder to a less than full rate and send frames containing remaining of the first message data together with the coded voice data based on a count of said frame counter, the amount remaining of the message data and the predetermined number of frames when the number of frames remaining before a first predetermined number of frames has been sent is the minimum number of frames necessary to send remaining of the first message data together with the coded voice data at less than full rate; and
a first radio transceiver circuit operatively connected to said first multiplexer to transmit the frames provided from said first multiplexer; and
a second transceiver comprising
a second vocoder to receive and code second speech of an unknown amount to produce second coded voice data;
a second multiplexer operatively connected to said second variable rate vocoder to receive the second coded voice data and send frames containing at least one of the second coded voice data and the message data; and
a second radio transceiver circuit operatively connected to said second multiplexer to transmit the frames provided from said second multiplexer.

12. An apparatus for multiplexing speech of an unknown length and message data of a known length, the message data of a known length requiring transmission through said multiplexer within a maximum response time, comprising:
variable rate vocoder means for receiving and voice coding the speech of an unknown length at full and less than full rates to produce coded voice data; and
multiplexer means for sending portions of the message data when said variable rate decoder means drops to a less than full rate, and comprising
counter means for counting each frame transmitted since receipt of the message data of a known amount; and
control means for lowering the rate of said variable rate vocoder means to a less than full rate based on a count of said counter means, the amount remaining of the message data and the predetermined number of frames to send remaining of the message data when transmission of the message data has not been completed at a point in time necessary to complete transmission of the message data before elapse of the maximum response time.

13. A method of sending frames of like duration, the frames containing any of speech of an unknown amount and message data of a known amount, the message data requiring transmission before the elapse of a predetermined number of frames, said method comprising the steps of:

(a) variably rate voice coding the speech of an unknown amount at one of full and less than full rates to produce coded voice data;

(b) sending frames containing the coded voice data, when said variably rate voice coding of said step (a) operates at a full rate;

(c) sending frames containing portions of the message data together with the coded voice data, when said variably rate voice coding of said step (a) operates at a less than full rate;

(d) counting each frame transmitted since receipt of the message data of a known amount; and (e) forcing the variably rate voice coding of said step (a) to a less than full rate based on the count in said step (d), an amount remaining of the message data, and the predetermined number of frames to send frames containing remaining of the message data together with the coded voice data, when the number of frames remaining before the predetermined number of frames has been sent is the minimum number of frames necessary to send remaining of the message data together with the coded voice data at less than full rate.

14. A method according to claim 13, wherein said method further comprises the step of (f) counting sent portions of the message data to determine the amount remaining of the message data to be sent; and wherein said step (e) comprises the substep of (e1) forcing the variably rate voice coding of said step (a) to a less than full rate based on the count in said step (d), the amount of remaining message data in said step (f), and the predetermined number of frames.

15. A method according to claim 13, further comprising the step of (f) counting each frame transmitted since receipt of another message data.

16. A method according to claim 15, further comprising the step of (g) determining if the another message data can be sent within elapse of a number of frames corresponding thereto and decreasing the count of said step (d) by the number of frames necessary to send the messages.

17. A method according to claim 13, wherein said step (e) forces the rate of the variably rate voice coding from full rate to one-half rate.

18. A method according to claim 13, wherein said step (e) forces the rate of the variably rate voice coding from full rate to one-eighth rate.

19. A method according to claim 13, wherein said step (a) of variably rate voice coding operates at a rate sufficient to perform an optimal voice coding of the speech; and wherein said step (e) forces the variably rate voice coding to a lower rate that performs less than optimal voice coding of the message data.

20. A method for multiplexing speech of an unknown amount and message data of a known amount, the message data requiring transmission before the elapse of a predetermined time, said method comprising the steps of:

(a) variably rate voice coding the speech of an unknown amount at one of full and less than full rates to produce optimally coded voice data;

(b) sending the optimally coded voice data, when said variably rate voice coding of said step (a) operates at a full rate;

(c) sending portions of the message data together with the optimally coded voice data, when said variably rate voice coding of said step (a) operates at a less than full rate;

(d) determining a remaining amount of the message data of a known amount after sending portions of the message data in said step (c);

(e) determining a remaining amount of time before elapse of the predetermined time required to send the message data; and (f) forcing the variably rate voice coding of said step (a) to a less than full rate when the remaining amount of time in said step (d) is the minimum amount of time necessary to finish sending the remaining amount of message data in said step (e) at less than full rate.

21. A method according to claim 20, wherein said step (d) of determining a remaining amount of the message data further comprises the step of (d1) counting portions of the message data sent in said step (c).

22. A method according to claim 20, wherein said step (e) of determining a remaining amount of time before elapse of the predetermined time required to send the message data further comprises the step of (e1) counting time elapsed since receipt of the message data.

23. A method according to claim 20, wherein said steps (b) and (c) send frames of a same unit length; and wherein said step (e) of determining a remaining amount of time before elapse of the predetermined time required to send the message data further comprises the step of (e1) counting frames sent since receipt of the message data.

24. A method according to claim 23, further comprising the steps of (g) counting each frame transmitted since receipt of another message data; and (h) determining if the another message data can be sent within elapse of a number of frames corresponding thereto and decreasing the count of said step (e) by the number of frames necessary to send the plural messages.

25. A method according to claim 20, wherein said step (f) forces the rate of the variably rate voice coding to one-half rate.

26. A method according to claim 20, wherein said step (f) forces the rate of the variably rate voice coding to one-quarter rate.

27. A method according to claim 20, wherein said step (f) forces the rate of the variably rate voice coding to one-eighth rate.

28. An apparatus for multiplexing speech of an unknown amount and message data of a known amount, the message data requiring transmission before the elapse of a predetermined time, comprising:

a variable rate vocoder to receive and code the speech of an unknown amount at one of full and less than full rates to produce coded voice data; and a multiplexer operatively connected to the variable rate vocoder to send the coded voice data when said variable rate vocoder operates at a full rate, to send portions of the message data together with the coded voice data when said variable rate vocoder operates at a less than full rate, and comprising a remaining message data circuit configured to determine a remaining amount of the message data of a known amount;

a remaining time circuit configured to determine a remaining amount of time before elapse of the predetermined time required to send the message data; and a control circuit operatively coupled to said variable rate vocoder, said remaining time circuit and said remaining message data circuit to force said variable rate vocoder to a less than full rate when the remaining amount of time indicated by said remaining time circuit is the minimum amount of time necessary to finish sending the remaining amount of message data indicated by said remaining message data circuit at less than full rate.

29. An apparatus according to claim 28, wherein said remaining message data circuit comprises a data counter operatively connected to count sent portions of the message data.

30. An apparatus according to claim 28, wherein said remaining time circuit comprises a time counter operatively connected to count time elapsed since receipt of the message data.

31. An apparatus according to claim 28, wherein said multiplexer sends frames of a same unit length; and wherein said remaining time circuit comprises a frame counter operatively connected to count frames transmitted by said multiplexer since receipt of the message data.

32. An apparatus according to claim 31, wherein said multiplexer further comprises another frame counter configured to count each frame transmitted since another receipt of another message data; and wherein said control circuit is operatively connected to said frame counter and said another frame counter to determine if the another message data can be sent within elapse of a number of frames corresponding thereto and to decrease the frame counter by the number of frames necessary to send the messages.

33. An apparatus according to claim 28, wherein said multiplexer forces said variable rate vocoder to one-half rate.

34. An apparatus according to claim 28, wherein said multiplexer forces said variable rate vocoder to one-quarter rate.

35. An apparatus according to claim 28, wherein said multiplexer forces said variable rate vocoder to one-eighth rate.

36. An apparatus according to claim 28, further comprising a radio transmitter operatively coupled to said multiplexer to transmit the coded voice data and message data sent from said multiplexer.

37. An apparatus according to claim 36, wherein said radio transmitter comprises a spread spectrum transmitter.

38. A radio transmitter according to claim 37, wherein said spread spectrum transmitter comprises a code division multiple access transmitter.

* * * * *

UNITED STATES PATENT AND TRADEMARK OFFICE
CERTIFICATE OF CORRECTION

PATENT NO. : 5,515,375
DATED : May 7, 1996
INVENTOR(S) : DeClerck

It is certified that error appears in the above-indentified patent and that said Letters Patent is hereby corrected as shown below:

On the title page item [57],
   line 14 of the Abstract, please replace "flames" with --frames--.

At column 4, line 67 please replace "flames" with --frames--.

Signed and Sealed this

Twenty-third Day of July, 1996

Attest:

BRUCE LEHMAN

Attesting Officer        Commissioner of Patents and Trademarks